United States Patent [19]
Jinkins

[11] Patent Number: 5,205,682
[45] Date of Patent: Apr. 27, 1993

[54] ADJUSTABLE DUAL BIT DRILLING MACHINE

[75] Inventor: Danny R. Jinkins, Hicksville, Ohio

[73] Assignee: Cooper Industries, Inc., Houston, Tex.

[21] Appl. No.: 684,295

[22] Filed: Apr. 12, 1991

[51] Int. Cl.$^5$ .......................................... B23B 45/14
[52] U.S. Cl. .................................. 408/46; 408/53; 408/79; 408/130; 408/702
[58] Field of Search .................. 408/14, 46, 51, 52, 408/53, 79, 97, 88, 99, 130, 131, 236, 702

[56] References Cited

U.S. PATENT DOCUMENTS

| | | | |
|---|---|---|---|
| 2,706,918 | 4/1955 | Blatt | 408/51 |
| 2,847,881 | 8/1958 | Allemann | |
| 2,909,949 | 10/1959 | Winslow | |
| 2,963,927 | 12/1960 | Hanger | |
| 3,599,958 | 8/1971 | Schindler | 269/48.1 |
| 3,652,175 | 3/1972 | Walters et al. | 408/46 |
| 3,663,115 | 5/1972 | Vindez et al. | 408/79 |
| 4,061,437 | 12/1977 | Strange et al. | 408/42 |
| 4,197,645 | 4/1980 | Scheicher | 433/128 |
| 4,286,902 | 9/1981 | Gagliano et al. | 408/79 |
| 4,365,916 | 12/1982 | Miyakawa | 408/46 |
| 4,396,318 | 8/1983 | Jensen et al. | 408/95 |
| 4,440,529 | 4/1984 | Henslee et al. | 408/130 |
| 4,594,030 | 6/1986 | Weigel, Jr. | 408/130 |
| 4,678,378 | 7/1987 | Koczarski | 408/46 |
| 4,728,230 | 3/1988 | Blum | 408/53 |
| 4,890,962 | 1/1990 | Nydegger | 408/14 |
| 4,897,000 | 1/1990 | Suzuki | 408/79 |
| 5,073,068 | 12/1991 | Jinkins et al. | 408/130 |

Primary Examiner—Daniel W. Howell
Attorney, Agent, or Firm—Burns, Doane, Swecker & Mathis

[57] ABSTRACT

A hand-held automatic drilling machine includes an expandable locating collet or locating pin, a pair of adjustably mounted drill bits for simultaneously drilling a pair of spaced-apart openings in a workpiece and a rotary drive motor for the drill bits. The machine also includes a first drive assembly for activating the expandable collet and a second drive assembly for advancing the drill bits into the workpiece. An adjustable dashpot provides resistance to the second drive assembly, thereby controlling the force applied to the drill bits and thus the feed rate. A bi-stable control valve commences the drilling cycle in one state and sequentially activates the first drive assembly and the second drive assembly. A full depth sensor moves the control valve to the opposite state, sequentially deactivating the second drive assembly and the first drive assembly.

34 Claims, 7 Drawing Sheets

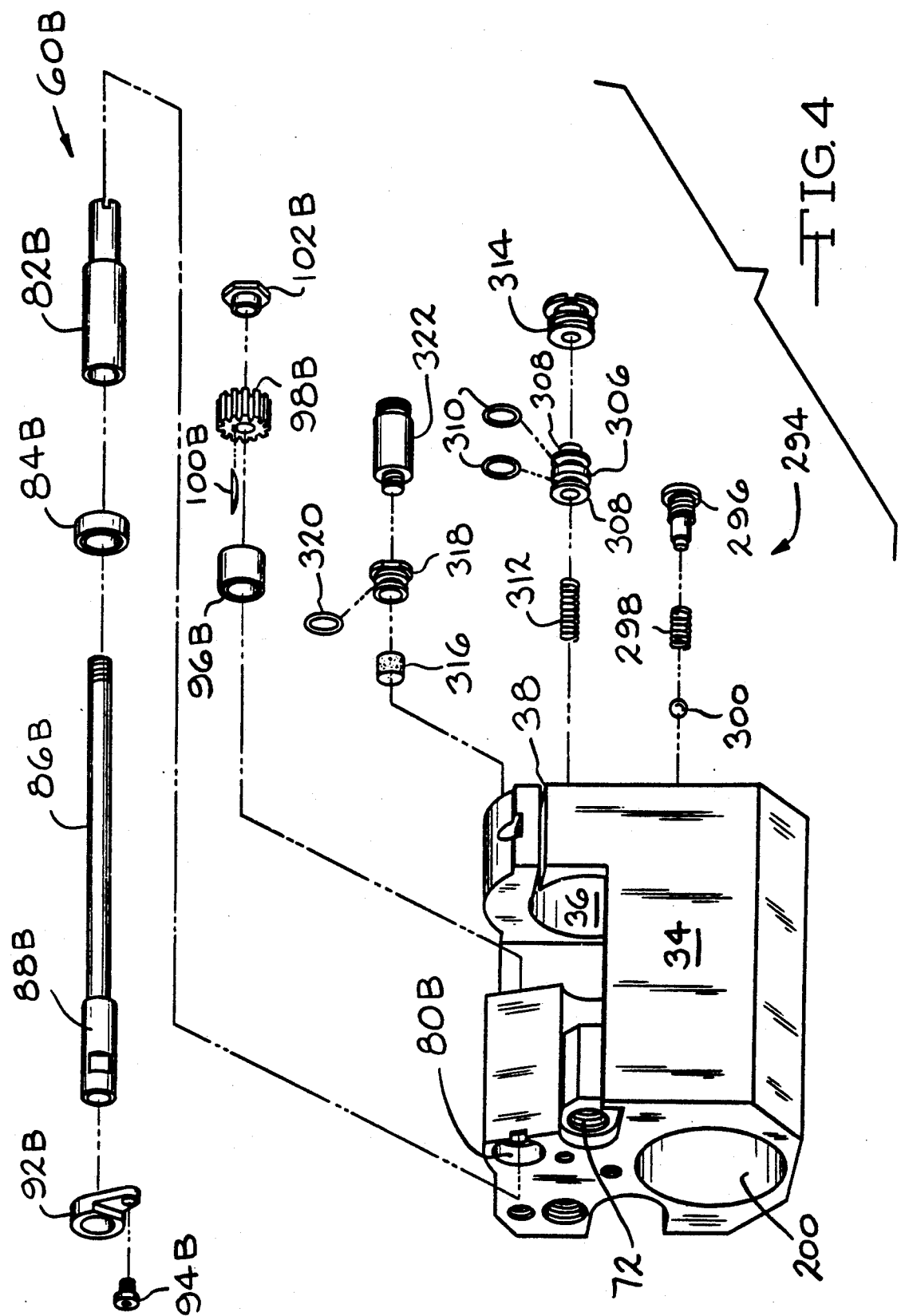

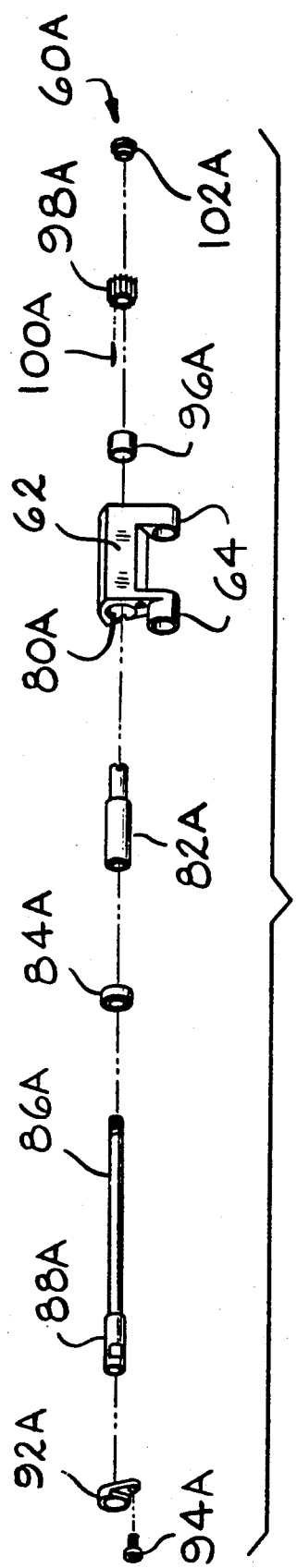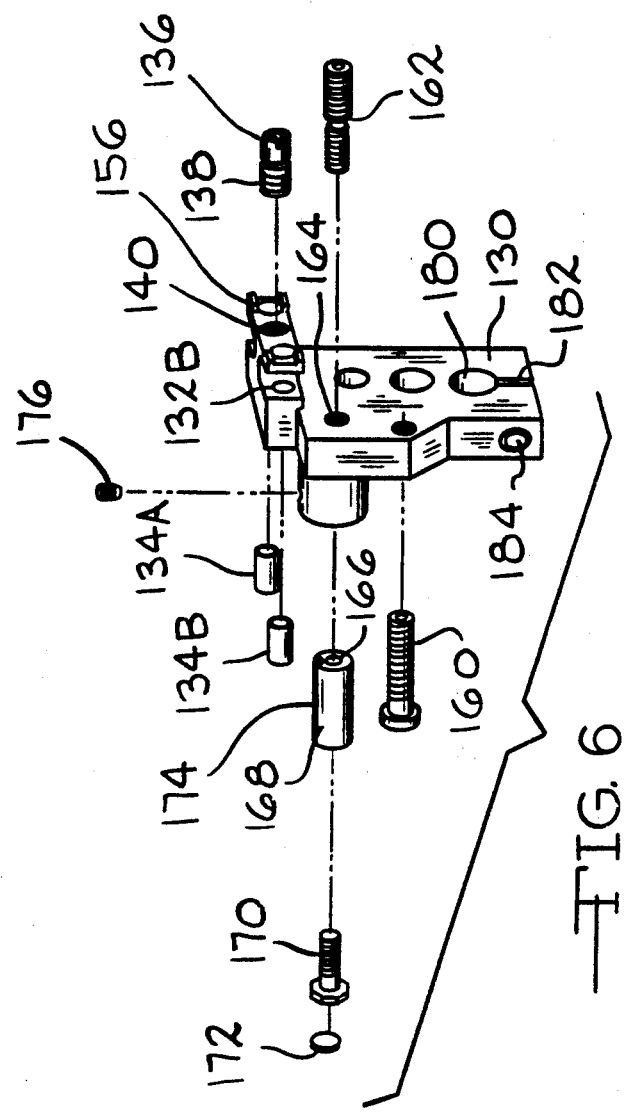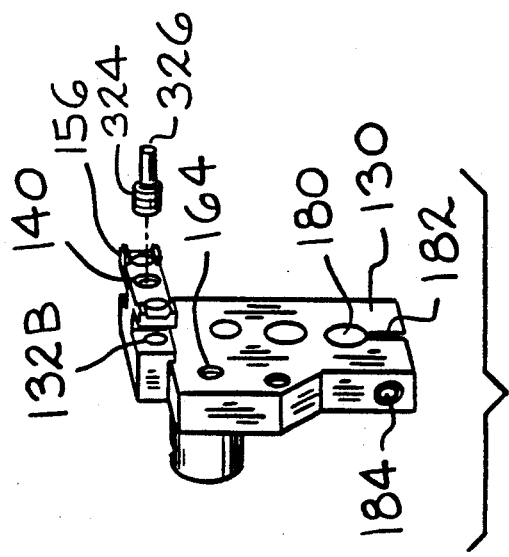

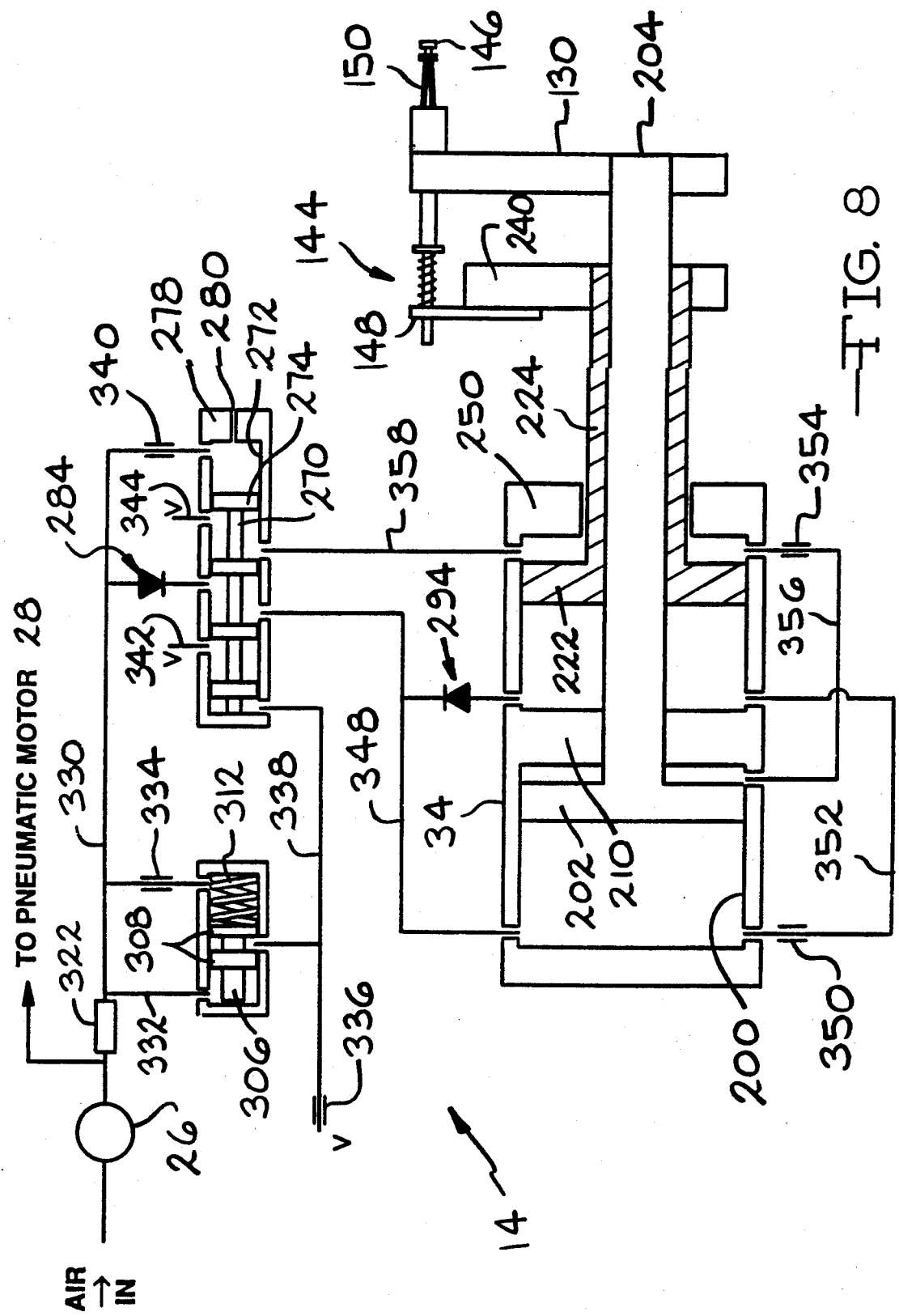

ADJUSTABLE DUAL BIT DRILLING MACHINE

BACKGROUND OF THE INVENTION

The invention relates generally to hand-held, dual bit drills and more specifically to an adjustable, hand-held, dual bit drilling machine having an expandable positioning collet or locating pin and components for providing an automatic operating sequence.

The precision drilling of blind or through openings in metal involves many parameters. Those that may be characterized as basic or fundamental include opening location, that is, its position on the X-Y plane of the workpiece surface and the nominal diameter of the opening. Other less apparent but equally important parameters include the opening shape, i.e., its circularity or lack thereof, the surface smoothness of the opening and the axial orientation thereof. Satisfying these parameters and others becomes a complex problem when more than one opening is drilled simultaneously due to interaction between the drills, the workpiece and the drilling equipment.

Significant attention has been addressed to resolving the difficulties attendant drilling openings in workpieces. For example, U.S. Pat. No. 2,847,881 teaches a drilling machine having locating pins which translate with and in advance of the drill bit to engage the workpiece prior to the commencement of a drilling operation. Electrical contacts sense whether proper locating pin motion, which indicates that the workpiece has been properly engaged, has occurred. U.S. Pat. No. 4,061,437 discloses a similar drilling apparatus having a pair of extendable pins which locate a workpiece prior to the engagement of the workpiece by a plurality of compressed air powered drills and the subsequent drilling thereby.

In U.S. Pat. No. 4,197,645, a multiple drill bit dental drill is disclosed. The multiple dental drills are closely spaced and rotate in opposite directions with the cutting surfaces of each drill overlapping the cutting surfaces of at least one adjacent drill.

U.S. Pat. No. 4,729,230 teaches a multiple spindle drilling machine having a drilling head which carries a plurality of drilling spindles. The drilling head is located by a pair of positioning pins which are moveable relative to the drilling head.

In U.S. Pat. No. 4,898,962, a portable positive feed drill is disclosed which includes a drill spindle and lead screw coupled to and commonly driven by a gear train. A pair of guides couple a work engaging foot to the housing of the drill. A depth of cut adjustment includes pairs of jam nuts disposed on a threaded shaft.

In U.S. Pat. No. 4,897,000, a clamping apparatus for drilling and countersinking holes in a workpiece is illustrated. The apparatus is utilized for countersinking rivet holes in airplane fuselages and includes a cantilevered arm for insertion in the fuselage. The arm includes a fluid cylinder and motor which is coupled to an anvil. These components are in turn coupled to a rotary actuator which may revolve the anvil assembly to an angle of at least 180°.

In order to properly locate the drill bit on the X-Y plane surface of the workpiece, an expandable collet has been utilized to position and hold the drilling machine and thus the drill bit in a fixed position relative to a previously drilled opening or locating aperture.

In U.S. Pat. No. 4,963,927, a pair of tandem, double acting pistons and cylinders are utilized to move a mandrel disposed in a collet in order to expand the collet. By selectively pressurizing the cylinders, the cylinder housing and collet mandrel translate up or down and into an engaged or disengaged position, as desired.

U.S. Pat. No. 3,599,958 teaches a collet expanding mechanism for use with a drill or similar machine wherein the collet mandrel is coupled to a direct acting air cylinder by a first class lever.

A similar device is disclosed in U.S. Pat. No. 3,663,115. This patent teaches another linkage between a double-acting pneumatic cylinder and the mandrel of a work and drill positioning collet. A pivot lever arm having a roller which contacts a ramp on the piston rod provides axial motion to the collet mandrel and expands and releases the collet.

The difficulties of single drill positioning and control are complicated when it is desired to drill multiple apertures. Significant attention has been paid to the solution of problems relating to this specific drilling task as well. For example, the device disclosed in U.S. Pat. No. 2,909,949 is a hand-held twin drill device having an expandable drill positioning collet. The axial positions of the drill bits are individually adjustable. The spacing between the axes of the drill bits is not readily adjustable.

Adjustment of the spacing between the axes of a pair of drills is, however, adjustable in U.S. Pat. No. 3,652,175. Here, the use of shaft couplings to permit shaft movement along a line of action perpendicular to the drill bit axis is disclosed.

In U.S. Pat. No. 4,286,902, a drill mechanism similar to that illustrated in U.S. Pat. No. 2,909,949 is disclosed. This drill, however, permits the adjustment of inter-drill spacing. This adjustment may be characterized as a fixed adjustment inasmuch as the removal and replacement of one dual shaft drive assembly by another having different spacing is the mode of adjusting such drill axis spacing. The axial position of each drill bit may also be adjusted by means similar to that disclosed in the '949 patent.

U.S. Pat. No. 4,365,916 also teaches a mechanism for adjusting the position of drills or other machining elements. A cylinder having internal drive components coupled to a spindle is offset from the cylinder axis. Rotation of the cylinder thus repositions the spindle.

In U.S. Pat. No. 4,396,318, a collet-type drill having improved clamping means is disclosed. Again, the collet is expanded by a mandrel operated by a double-acting pneumatic piston.

Finally, U.S. Pat. No. 4,678,378 presents an adjustable drill head attachment for mounting on a dual drill gun or drill press. The drill includes a threaded adjustment mechanism and guide rod.

From the foregoing review of prior art patents, it is apparent that improvements in the art of collet positioned, dual bit drilling machines having adjustments to both the axial drill bit positions as well as the axial inter-drill spacing are both desirable and possible.

SUMMARY OF THE INVENTION

A hand-held automatic drilling machine includes an expandable locating collet or locating pin, a pair of adjustable drill bits for simultaneously drilling a pair of spaced-apart openings in a workpiece, a rotary drive motor for rotating the drill bits and pneumatic control logic for controlling the overall operating sequence of the drill assembly. Both the spacing between the drill bits and the axial position of one of the drill bits is adjustable. The drilling machine also includes a first drive assembly for activating the expandable collet and a second drive assembly for advancing the drill bits into the workpiece. An adjustable dashpot provides resistance to the second drive assembly, thereby controlling the force applied to the drill bits and thus the feed rate. A bi-stable control valve functioning in conjunction with an initializing pulse valve commences the drilling cycle by sequentially activating the first drive assembly and the second drive assembly. When the drill bits have reached the desired depth, a full depth sensor moves the controller to the opposite state, sequentially deactivating the second drive assembly and the first drive assembly.

BRIEF DESCRIPTION OF THE DRAWINGS

FIG. 4 is an exploded perspective view of a dual bit drilling machine according to the present invention illustrating additional drill and pneumatic control components;

FIG. 5 is an exploded perspective view of the moveable spindle of the dual bit drilling machine according to the present invention;

FIG. 6 is an exploded perspective view of the components of the baseplate and foot of a dual bit drilling machine according to the present invention;

FIG. 7 is an exploded perspective view of a baseplate and foot having an alternate embodiment locating component, namely, a fixed pin;

FIG. 8 is a diagrammatic view of the pneumatic control circuitry of a dual bit drilling machine according to the present invention in a standby or ready state.

DESCRIPTION OF THE PREFERRED EMBODIMENT

Figure 1:
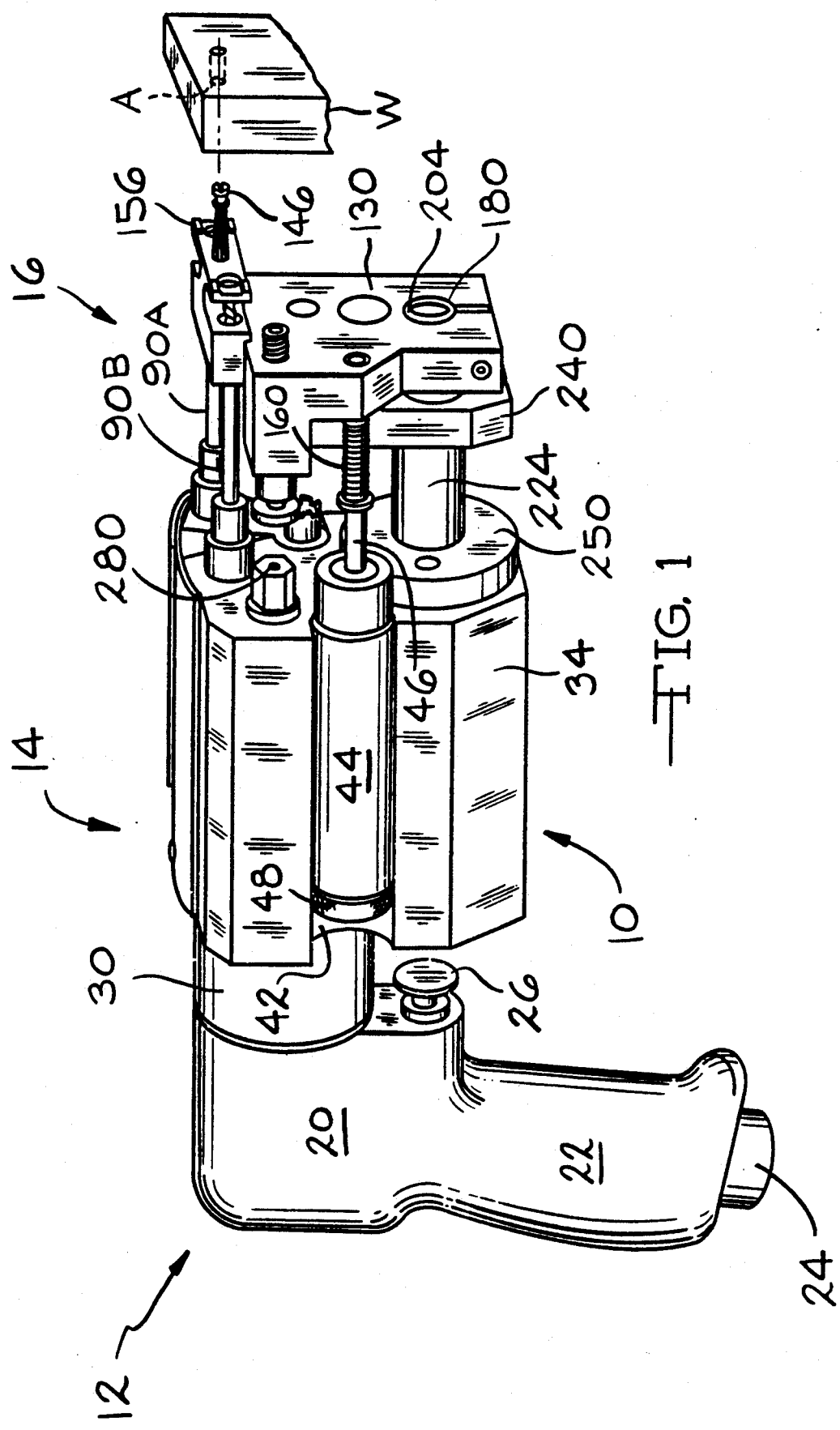
FIG. 1 is a perspective view of a dual bit drilling machine according to the present invention.
Figure 2:
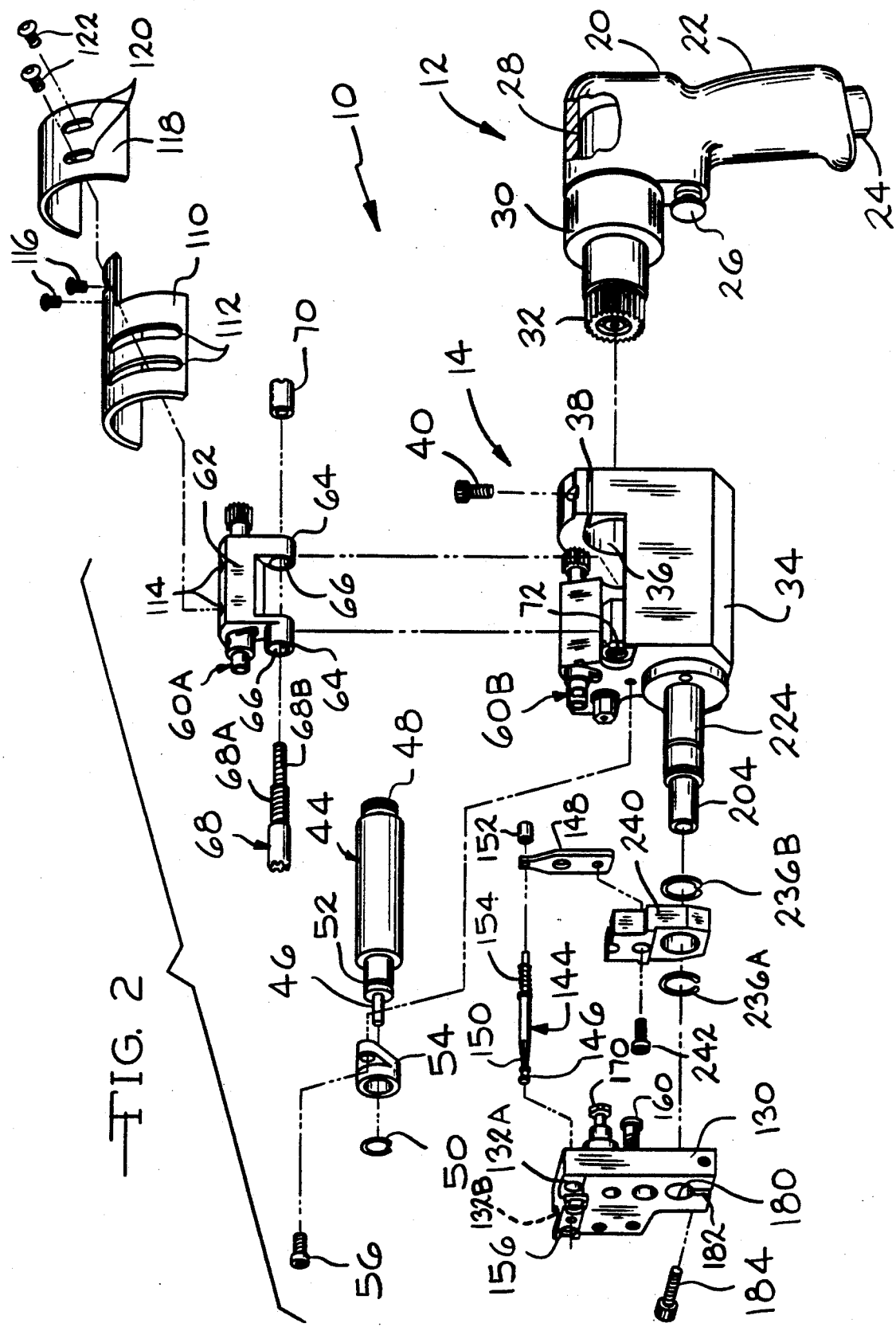
FIG. 2 is an exploded view of the components of a dual bit drilling machine according to the present invention illustrating the drill adjustment and collet positioning components.

Turning now to FIGS. 1 and 2, an adjustable dual bit drilling machine with expanding collet is illustrated and generally designated by the reference numeral 10. The adjustable dual bit drilling machine 10 comprises a motor assembly 12, a control assembly 14 and a foot assembly 16. The motor assembly 12 includes a housing 20 having a pistol grip handle 22 and pneumatic hose coupling 24. Alternatively, the housing 20 may generally define a cylinder, containing the associated components in an in-line arrangement. The pneumatic hose coupling 24 releasably accepts a pneumatic hose (not illustrated) which provides compressed air to the motor assembly 12 and the control assembly 14. The pistol grip 22 of the motor assembly 12 defines a passageway (not illustrated) communicating between the pneumatic hose coupling 24 and a manually operable trigger valve 26. When the trigger valve 26 is depressed, compressed air is supplied to a pneumatic vane motor 28 and the control assembly 14. The pneumatic vane motor 28 provides rotary energy to a speed reducing gear train 30 and, in turn, to an output gear 32.

The control assembly 14 includes a complexly configured housing 34 defining cylinders, openings, bearings and passageways which receive, position, support and provide communication between various elements and subassemblies of the control assembly 14. Preferably, the housing 34 is aluminum or other material having similar characteristics. The housing 34 defines a circular opening 36 having a diameter complemental to the diameter of the neck region of the motor assembly 12 directly behind the pinion gear 32. The housing 34 also defines a through slot 38 extending generally tangentially from the wall of the opening 36. A threaded fastener 40 extends across the slot 38 and into a threaded opening in the housing 34 and may be tightened to secure the motor assembly 12 in the housing 34.

The right face of the housing 34 defines a semicylindrical channel 42 which receives a complementarily configured adjustable, feed rate control assembly 44. The feed rate control assembly 44 is an adjustable dashpot like or similar to devices manufactured by Deschner Corporation and includes a piston rod 46 extending from one end and a knurled adjustment knob 48 disposed for rotation at the opposite end. The adjustment knob 48 may be positioned to provide variable resistance to axial translation of the piston rod 46 into the body of the feed rate control 44 to control the force applied to the drill bits and thus the cutting speed thereof as will be more fully described below. The feed rate control 44 is secured to the housing 34 by a snap ring 50 which is received within a circumferential groove 52 in the nose of the feed rate control assembly 44. The nose of the feed rate control assembly 44 is received in a collar 54 which is, in turn, secured to the housing 34 by a threaded fastener 56.

The control assembly 14 also includes a pair of spaced apart spindle assemblies 60A and 60B. The left spindle assembly 60A is mounted for rotation in an adjustable spindle housing 62 whereas the right spindle assembly 60B is disposed for rotation along an axis fixed within the housing 34. The adjustable spindle housing 62 includes a pair of spaced apart ears 64 having aligned front and rear openings 66 which receive a stepped, threaded adjustment screw 68 having a castellated head. The threaded adjustment screw 68 has a first region of threads 68A having a first lead and a second region of smaller threads 68B having a second, smaller lead. The threads 68B of the threaded adjustment screw 68 seat within a threaded insert 70 secured within the rear opening 66 and the threads 68A are engaged by complemental threads in a passageway 72 (also illustrated in FIG. 4) in the housing 34. Rotation of the threaded adjustment screw 68 in a first direction translates the adjustable spindle housing 62 forward, toward the front of the housing 34 in accordance with the difference in lead between the threads 68A and 68B and vice versa.

Turning now to FIG. 5, the adjustable left spindle assembly 60A and the housing 62 are illustrated. The housing 62 includes a through opening 80A which receives a spindle sleeve 82A. A spindle bearing 84A is disposed adjacent the front of the spindle sleeve 82A and rotatably receives and supports a spindle 86A. The spindle 86A includes a chuck or collet 88A for receiving a drill bit 90A (illustrated in FIG. 1). The spindle 86A is retained within the sleeve 82A and the spindle housing 62 by a spindle bearing cap 92A. The bearing cap 92A is secured to the housing 34 by a threaded fastener 94A. An additional bearing 96A supports the opposite end of the spindle 86A within the spindle housing 62. A pinion gear 98A is coupled to the spindle 86A by a key 100A and is secured to the spindle 86A by a jam nut 102A. The pinion gear 98A and the spindle 86A are engaged and driven by the output gear 32 on the motor assembly 12.

As illustrated in FIG. 4, the right drive spindle assembly 60B is mounted within the housing 34 and includes components identical to those in the left drive spindle assembly 60A. Thus, the housing 34 includes a through opening 80B which receives a spindle sleeve 82B. A spindle bearing 84B is disposed adjacent the front of the spindle sleeve 82B and rotatably receives and supports a spindle 86B. The spindle 86B includes a chuck or collet 88B for receiving a drill bit 90B (illustrated in FIG. 1). The spindle 86B is retained within the sleeve 82B and housing 34 by a spindle bearing cap 92B. The bearing cap 92B is secured to the housing 34 by a threaded fastener 94B. An additional bearing 96B supports the opposite end of the spindle 86B within the housing 34 and a pinion gear 98B is coupled to the spindle 86B by a key 100B and is secured to the spindle 86B by a jam nut 102B. The pinion gear 98B and the spindle 86B are engaged and driven by the output gear 32 on the motor assembly 12.

As will be appreciated, the spindle housing 62 and thus the spindle 86A pivots about the axis of the threaded adjustment screw 68. The position of the spindle housing 62 and the spindle 86A, once selected, may be fixed. As illustrated in FIG. 2, the control assembly 14 includes a first curved, inner guard 110 having a pair of parallel slots 112 aligned with a pair of threaded openings 114 in the adjustable spindle housing 62. The first curved, inner guard is secured to the housing 34 by a pair of threaded fasteners 116. A second curved, outer guard 118 defines a pair of similarly spaced parallel slots 120. The slots 120 receive a pair of threaded fasteners 122 which seat within the threaded openings 114 of the adjustable spindle housing 62. When the threaded fasteners 122 are loosened, the adjustable spindle housing 62 may be pivoted about the threaded adjustment screw 68 to achieve desired spacing between the spindle assemblies 60A and 60B and the drill bits 90A and 90B. When the desired spacing is achieved, the threaded fasteners 122 may be tightened and the desired spacing maintained.

Turning now to FIGS. 2 and 6, the foot assembly 16 includes a baseplate 130. The baseplate 130 includes a pair of spaced apart apertures 132A and 132B which receive a pair of drill bushings 134A and 134B which, in turn, rotatably receive the drill bits 90A and 90B. Through the agency of the adjustable spindle housing 62, the spacing between the drill bits 90A and 90B may be adjusted. However, the spacing between the bushings 134A and 134B in a given baseplate 130 is fixed. Accordingly, it is intended that various interchangeable baseplates 130 having distinct center-to-center distances between the apertures 132A and 132B will be utilized to provide various desired spacings between the drill bits 90A and 90B.

Spaced centrally between the bushings 134A and 134B is a clamp collet bushing 136. The clamp collet bushing 136 includes male threads 138 which are received within a complementarily threaded opening 140 in the baseplate 130. The clamp collet bushing 136 slidably receives a collet assembly 144. The collet assembly 144 includes a centrally disposed conical mandrel 146 which may be translated axially by a drive member 148 to spread a plurality of collet ears 150 as will be readily appreciated. A collar 152 is coupled to the mandrel 146 and is acted upon by the drive member 148. A compression spring 154 maintains the collet ears 150 against the end of the mandrel 146. The baseplate 130 also includes a forward foot 156 which engages the surface of a workpiece W during a drilling operation. Typically, the workpiece W will define one or more previously prepared index or register apertures A into which the collet ears 150 of the mandrel assembly 144 are serially inserted prior to commencing a drilling operation.

Also disposed upon the foot assembly 16 is a threaded stop 160 which provides rapid traverse adjustment, that is, traverse of the drill bits 90A and 90B at a relatively high axial rate before the feed rate control 44 is engaged. The stop 160 may simply be rotated clockwise or counterclockwise to axially position it and select the distance travelled by the drill bits 90A and 90B before the piston rod 46 of the feed rate control assembly 44 is engaged thereby slowing traverse of the drill bits 90A and 90B.

The foot assembly 16 also includes a dual diameter, dual lead, threaded adjustment screw 162 which functions as the fine depth of drilling adjustment. The larger diameter portion of the threaded adjustment screw 162 defines threads at a specific lead and is received within a complementarily sized and threaded opening 164 in the baseplate 130. The smaller diameter portion of the threaded adjustment screw 162 defines threads of a second, distinct lead and is received within a complementarily threaded portion of a through aperture 166 in a depth stop tube 168. The opposite end of the depth stop tube 168 receives a coarse depth adjustment screw 170. A circular gasket 172 is received on and secured to the head of the coarse adjustment screw 170. The depth stop tube 168 includes a longitudinal groove 174 which slidingly receives a set screw 176. The set screw 176 inhibits rotation of the depth stop tube 168 so that as the threaded adjustment screw 162 is rotated, the depth stop tube 168 and the coarse depth adjustment screw 170 translate axially in accordance with the difference in lead between the threaded portions of the adjustment screw 162.

The baseplate 130 is secured to components of the control assembly 14 by an adjustable clamp mechanism including a through aperture 180, a slit 182 which extends radially from the through aperture 180 to an adjacent edge and a transversely disposed threaded fastener 184 which extends across the slot 182. By advancing the threaded fastener 184, the slot 182 may be collapsed, thereby securing the baseplate 130 to a component disposed within the aperture 180.

Figure 3:
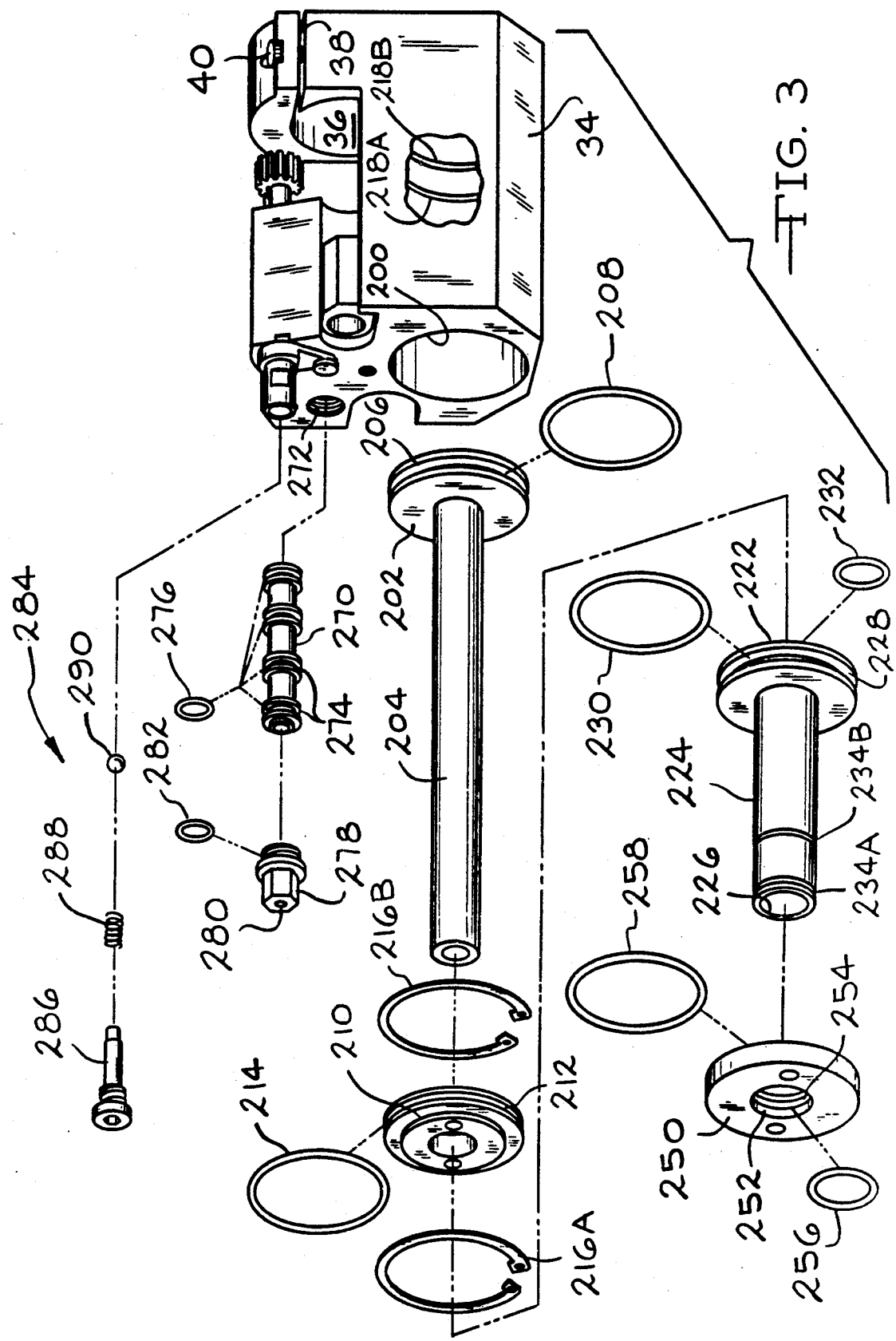
FIG. 3 is an exploded perspective view of the dual bit drilling machine according to the present invention illustrating the pneumatic positioning and control components.

Turning now to FIGS. 2 and 3 and returning to the description of the control assembly 14, the housing 34 defines a cylinder 200 which receives a first, double-acting feed piston 202 secured to or integrally formed with a first elongate piston rod 204. The feed piston 202 defines a circumferential groove 206 which receives an O-ring 208 which sealingly engages the wall of the cylinder 200. The feed piston 202 is constrained to translate within a portion of the cylinder 200 by a cylindrical bulkhead 210 defining a circumferential groove 212 which receives an O-ring 214. The bulkhead 210 is maintained at a fixed axial position within the cylinder 200 by a pair of snap rings 216A and 216B which seat within a pair of suitably spaced apart circumferential grooves 218A and 218B formed in the wall of the cylinder 200. The terminal portion of the elongate piston rod 204, i.e. that end most distant the feed piston 202, is received within the through aperture 180 of the baseplate 130 and secured to the baseplate 130 by tightening the threaded fastener 184. Accordingly, translation of the feed piston 202 causes like translation of the baseplate 130.

On the opposite side of the bulkhead 210 from the first, feed piston 202 is disposed a second, double-acting clamp piston 222. The clamp piston 222 is secured to or integrally formed with a second elongate piston rod 224 which defines a coaxial aperture 226. The coaxial aperture 226 is sized to closely receive the elongate piston rod 204. The clamp piston 222 defines a circumferential groove 228 which receives an O-ring 230 which sealingly engages the wall of the cylinder 200. An O-ring 232 is disposed between and provides sealing engagement between the coaxial aperture 226 and the elongate piston rod 204. The clamp piston rod 224 defines a pair of spaced-apart circumferential grooves 234A and 234B which receive a pair of complementary snap rings 236A and 236B which couple a mandrel drive bracket 240 thereto. The collet drive member 148 is secured to the collet drive bracket 240 by a suitable threaded fastener 242. Accordingly, translation of the second, clamp piston 222 in one direction translates the conical mandrel 146 and expands the collet ears 150 whereas translation in the opposite direction contracts the collet ears 150. The second, clamp piston 222 is retained within the cylinder 200 of the housing 34 by a threaded bulkhead 250. The threaded bulkhead 250 includes a through passageway 252 having a circumferential groove 254 which receives an O-ring 256 which sealingly engages the exterior surface of the piston rod 224 and an O-ring 258 which provides a seal between the threaded bulkhead 250 and the housing 34.

Referring now to FIGS. 3 and 8, the pneumatic control circuitry of the control assembly 14 is illustrated. A shuttle-type feed control valve 270 is received within a suitable ported passageway 272 in the housing 34. The feed control valve 270 is a shuttle valve having four lands or enlarged diameter portions 274 which are suitably configured to receive a like plurality of O-rings 276 (one of which is illustrated). The feed control valve 270 is retained within the housing 34 by a threaded vent plug 278 defining an axial orifice or vent 280. The threaded vent plug 278 is secured in the housing 34 to retain the feed control valve 270 and is sealed against the housing 34 by an O-ring 282. A first check valve assembly 284 is disposed within the housing 34 and includes a first check valve plug 286, a first compression spring 288 and a first check ball 290 which is biased toward a suitably configured valve seat (not illustrated) in the housing 34 by the compression spring 288.

Referring now to FIGS. 4 and 8, a second check valve assembly 294 includes a second check valve plug 296, a second compression spring 298 and a second check ball 300. The check ball 300 is biased toward a suitably configured valve seat (not illustrated) in the housing 34 by the compression spring 298. A pulse valve 306 is also received within the housing 34 in a suitably sized blind aperture. The pulse valve 306 includes a pair of spaced apart lands 308 having suitable channels for receiving a pair of O-rings 310 which sealingly engage the housing 34. A compression spring 312 biases the pulse valve 306 to the position illustrated in FIG. 8. A threaded plug 314 retains the pulse valve 306 in the aperture in the housing 34. Finally, the drill 10 includes an air filter cartridge 316 which is sealingly secured in the housing 34 by a fitting 318 including an O-ring 320. A suitable threaded connector 322 couples a compressed air line to the fitting 318.

Referring now to FIGS. 1 and 7, the baseplate 130 of the foot assembly 16 is illustrated having the foot 156 and an alternate embodiment device for locating the drilling machine 10 and the drill bits 90A and 90B relative to an aperture A in a workpiece W. The baseplate 130 includes the threaded aperture 140 which receives a complementarily threaded region 324 of a cylindrical, fixed register or locating pin 326. The fixed locating pin 326 may be installed in the threaded aperture 140 and utilized in place of the clamp collet bushing 136 and the collet assembly 144 in applications where gripping engagement of the workpiece by the collet assembly 144 is unnecessary or where the drilling machine 10 and workpiece W are held in position by other clamping or engagement devices. It will be appreciated that the components driving the collet assembly 144 in a drilling machine 10 of the type described herein, will "freewheel", that is, will translate but have no effect on the workpiece W when the fixed locating pin 326 is utilized.

Figure 9:
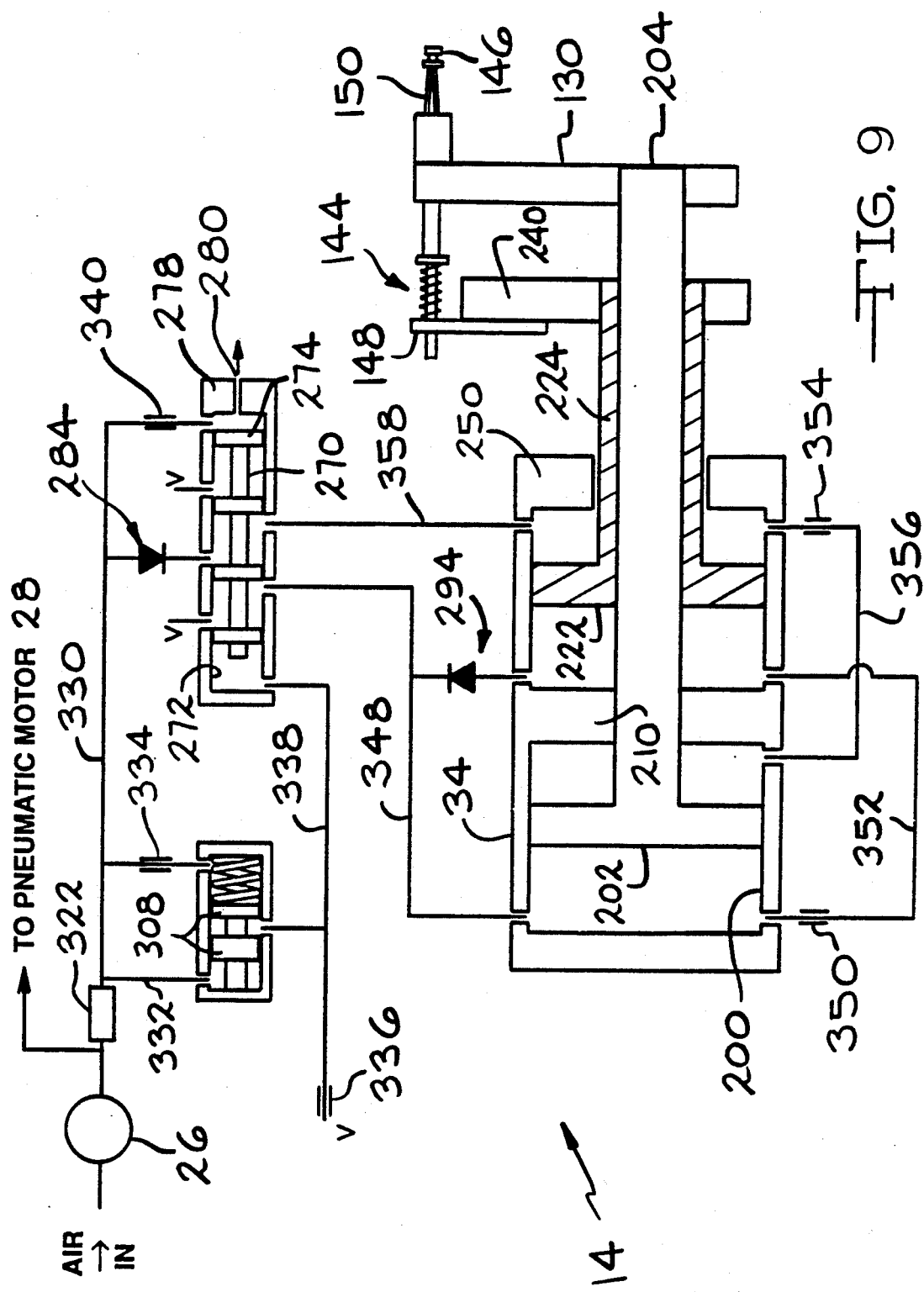
FIG. 9 is a diagrammatic view of the pneumatic control circuitry of a dual bit drilling machine according to the present invention during the operating cycle.

Referring now to FIGS. 2, 8 and 9, the porting, vents and fluid communication passageways in the housing 34 which comprise a portion of the control assembly 14 will now be described. The housing 34 defines a branching air passageway 330 which provides air to one end of the pulse valve 306 through a line 332 and also to the end of the pulse valve 306 engaged by the compression spring 312 through a restriction 334. The pulse valve 306 is also vented to atmosphere through a restriction 336 in a vent line 338. Compressed air is also supplied to the feed control valve 270 through the check valve assembly 284 and also through a restriction 340. The chamber 272 which receives the feed control valve 270 is vented at one end through the vent 280, along its length by a pair of vents to the atmosphere, 342 and 344, as well as vented to the atmosphere through the restriction 336 through the line 338. A pneumatic line or passageway 348 communicates between the chamber 272 and the full (left) face of the first, feed piston 202. The pneumatic line or passageway 348 also communicates with the full (left) face of the second, clamp piston 222 through the check valve 294. The chamber adjacent the left face of the feed piston 202 also communicates with the chamber adjacent the left face of the clamp piston 222 through a restriction 350 and pneumatic line 352. Similarly, the chamber adjacent the opposite (right) face of the feed piston 222 communicates with the chamber adjacent the opposite (right) face of the clamp piston 222 through a restriction 354 and a pneumatic line or passageway 356. Finally, a pneumatic line 358 communicates between the chamber adjacent the right face of the clamp piston 222 and the feed control valve 270.

Referring now to FIGS. 1, 8 and 9, the operation of the dual bit drilling machine 10 will be described. One of the primary features and purposes of the dual bit drilling machine 10 is to accurately drill two openings relative to an existing register or index aperture A in a workpiece W. Accordingly, the first step of a drilling operation is to insert the mandrel 146 and the collapsed collet ears 150 into the index aperture A of the workpiece W while pressing the face of the foot 156 flatly against the workpiece W.

Compressed shop air at a pressure of about 90 p.s.i. is supplied to the tool 10 through the fitting 24 and thence to the trigger valve 26. When the trigger valve 26 is depressed, compressed air is provided to the pneumatic vane motor 28 and to the control assembly 14 through the connector 322. When the trigger valve 26 is depressed, compressed air enters the passageway 330 and air is introduced to the pulse valve 306 through the line 332, and at a slower rate, through the restriction 334, driving the pulse valve 306 to the right as illustrated in FIG. 8 and providing air flow to the line 338. Pressure builds in the portion of the chamber 272 of the feed control valve 270 supplied by the line 338 inasmuch as the restriction 336 inhibits air flow to the atmosphere. Accordingly, the feed control piston 270 shifts to the right, to the position illustrated in FIG. 9. The feed control valve 270 is now in the feed position. Air in the passageway 330 is also supplied through the check valve 284 to the feed control valve 270 as well as through the restriction 340.

Air continues to pass through the restriction 334 and into the chamber of the pulse valve 306 containing the compression spring 312. Accordingly, as forces generated by the compressed air on the pulse valve 306 equalize, force provided by the compression spring 312 returns the pulse valve 306 to the left, to the position illustrated in FIG. 8.

With the feed control valve 270 in the position illustrated in FIG. 9, compressed air is provided through the line or passageway 358 to the clamp piston 222. The clamp piston 222 begins moving to the left as illustrated in FIG. 9, translating the mandrel 146 and expanding the collet ears 150 in an index aperture A in the workpiece W thereby holding the foot 156 against the workpiece W. The air passageway 356 provides compressed air to the right face of the feed piston 202 but the restriction 354 slows such air flow. Accordingly, the feed piston 202 will exhibit negligible movement until the clamp piston 222 has been substantially fully pressurized and traversed to the left, to the full clamping position. The check valve 294 also facilitates prompt traverse of the clamp piston 222 by allowing exhaust of the air in the chamber behind the clamp piston 222 as it translates to the left. The drill bits 90A and 90B will advance relatively rapidly until the piston rod 46 of the feed rate control assembly 44 contacts the threaded stop 160. The drilling machine 10 is now in its drilling mode and will continue to advance into the workpiece W in accordance with the force provided by the feed piston 202 as counteracted by the feed rate control assembly 44.

When the gasket 172 of the coarse depth adjustment screw 170 contacts the vent 280, signaling the attainment of full drilling depth by the drill bits 90A and 90B, the vent 280 is blocked off. Pressure then increases in the adjacent portion of the chamber 272, driving the feed control valve 270 back to the left, to the position illustrated in FIG. 8. Compressed air now flows through the check valve 284 and through the line 348 to the other face of the feed piston 202 causing the feed piston 202 to translate to the right and retract the drill bits 90A and 90B. Compressed air is also supplied to the clamp piston 222 through the line 352 and restriction 350. Due to the restriction 350, motion of the clamp piston 222 is delayed and unclamping will therefore result only after the drill bits 90A and 90B and the feed piston 222 are substantially fully retracted. The tool 10 has now returned to its quiescent or ready state. The control circuitry including the control valve 270 and associated components thus functions as two state logic circuitry; the first state being the quiescent or ready state which includes the retract and unclamp operations and the second state being the operate, i.e., clamp and advance, state.

It should be noted that the check valve 284 closes off the pneumatic line or passageway 348, thereby retaining air behind the feed piston 202 and the clamp piston 222. This maintains their relative positions to the right as illustrated in FIG. 8 and facilitates insertion of the mandrel 146 and collapsed collet ears 150 into the index aperture A of a workpiece W.

By way of summation, several features and capabilities of the dual bit adjustable drilling machine 10 are here noted.

First of all, the combination of the feed rate control assembly 44, the threaded stop 160 and the feed piston 202 not only provides rapid advance at the commencement of each drilling cycle but also provides adjustable resistance to the advance of the drill bits 90A and 90B and thus controls the feed rate of the drilling machine 10. In the quiescent, or standby position, the threaded stop 160 may be adjusted by rotating it to either contact the piston rod 46 of the feed rate control assembly 44 or to provide a gap therebetween. If there is no gap, the feed rate control assembly 44 will, from the onset of operation, provide resistance to the force of the feed piston 202 in accordance with the resistance selected by the adjustment knob 48. If there is a gap between the piston rod 46 and threaded stop 160, the feed piston 202 will relatively rapidly advance the drill bits 90A and 90B until the piston rod 46 contacts the threaded stop 160 at which time the feed control assembly 44 will provide the selected resistance to subsequent travel.

Secondly, the drilling depth of the drilling machine 10 may be readily adjusted by rotating the coarse adjustment screw 170 or the threaded adjustment screw 162 which functions as a fine depth of drilling adjustment. By advancing the head of the coarse adjustment screw 170 and the gasket 172 toward the threaded plug 278 defining the vent 280, the drilling depth is reduced and vice versa. Exceptionally fine drilling depth adjustment is facilitated by the dual lead threaded adjustment screw 162.

Thirdly, in order to compensate for the wearing away of the drill bits 90A and 90B or simply their unequal lengths, the threaded adjustment screw 68 may be rotated clockwise or counterclockwise in order to axially translate the adjustable spindle housing 62 and thus the associated left spindle assembly 60A and left drill bit 90A relative to the right spindle assembly 60B and the right drill bit 90B. In this manner, the relative longitudinal axial positions of the tips of the drill bits 90A and 90B may be adjusted as desired. Once again, the dual lead configuration of the threaded adjustment screw 68 facilitates accurate axial adjustment of the drill bit 90A.

The inter-axis drill bit spacing, that is, the center-to-center distance between the drill bits 90A and 90B is also adjustable, as noted above. The threaded fasteners 122 may be loosened and the adjustable spindle housing 62 may be pivoted about the threaded adjustment screw 68 to position or reposition the left drill bit 90A relative to the right drill bit 90B. Also as noted above, a baseplate 130 having the appropriate spacing between the apertures 132A and 132B must be selected and secured to the first, elongate piston rod 204 by positioning the through aperture 180 of the baseplate 130 therearound and tightening the threaded fastener 184. Similarly, the drill bits 90A and 90B may be replaced by opening the respective chucks or collets 88A and 88B and removing and replacing the drill bits 90A and 90B, respectively.

The foregoing disclosure is the best mode devised by the inventor for practicing this invention. It is apparent, however, that apparatus incorporating modifications and variations will be obvious to one skilled in the art of dual bit drilling machines. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A dual bit drilling machine comprising, in combination,
   a pair of spaced-apart spindles adapted to receive a respective pair of drill bits,
   means for driving said spindles,
   first means for adjusting the axial spacing between said spindles,
   collet means for engaging a pilot opening,
   means for expanding and contracting said collet means,
   means for advancing and retracting said spindles, and
   control means for sequentially activating said means for driving, said means for expanding and said means for advancing, wherein said first means for adjusting includes a first housing having an aperture for receiving one of said spindles and a second housing pivotally secured to said first housing and defining a second aperture for receiving the other of said spindles and means for maintaining the position of said second housing relative to said first housing.

2. The dual bit drilling machine of claim 1 further including second means for adjusting the longitudinal axial position of one of said spindles relative to the other of said spindles.

3. The dual bit drilling machine of claim 2 wherein said second means for adjusting includes a first housing for receiving one of said spindles and a second housing for receiving the other of said spindles, threaded adjustment means coupling said first and said second housings, said threaded adjustment means including a first region of threads having a first lead engaging said first housing and a second region of threads having a second, distinct lead engaging said second housing.

4. The dual bit drilling machine of claim 1 wherein said collet means includes a plurality of collet ears and an axially translatable mandrel disposed within said collet ears.

5. The dual bit drilling machine of claim 1 wherein said means for expanding and contracting said collet means includes a mandrel disposed within said collet means and a piston disposed within said a cylinder, said piston operably coupled to said mandrel.

6. The dual bit drilling machine of claim 1 further including a housing rotatably supporting said spindles and defining a cylinder and wherein said means for advancing and retracting said spindles includes a baseplate for positioning against a workpiece and a piston disposed in said cylinder, said piston including a piston rod coupled to said baseplate.

7. The dual bit drilling machine of claim 1 further including a housing defining a pair of cylinders and wherein said means for expanding and contracting said collet means includes a mandrel disposed within said collet means and a first piston disposed within one of said pair of cylinders, said first piston operably coupled to said mandrel and wherein said means for advancing and retracting said spindles includes a baseplate for positioning against a workpiece, a second piston disposed in the other of said pair of cylinders, said second piston operably coupled to said baseplate.

8. The dual bit drilling machine of claim 7 further including a first piston rod for operably coupling said first piston and said mandrel and a second piston rod for operably coupling said second piston and said baseplate wherein one of said piston rods defines a through, coaxial passageway and the other of said piston rods is disposed within said passageway.

9. The dual bit drilling machine of claim 1 wherein said control means includes a manually operable device for providing energy to said driving means and to logic circuitry, said logic circuitry having a first state which provides energy to said expanding and contracting means for expanding said collet means and to said advancing and retracting means for advancing said spindles and a second state which provides energy to said expanding and contracting means for contracting said collect and to said advancing and retracting means for retracting said spindles.

10. The dual bit drilling machine of claim 1 further including dashpot means for counteracting the means for advancing or retracting said spindles when said just recited means is advancing said spindles.

11. A dual bit drilling machine comprising, in combination,
    a pair of spaced-apart drill bit receiving spindles,
    a housing defining a respective pair of apertures for rotatably receiving said pair of spindles,
    a first cylinder defined by said housing, a first piston slidably disposed in said first cylinder and coupled to a first piston rod,
    a second cylinder defined by said housing, a second piston slidably disposed in said second cylinder and coupled to a second piston rod,
    a baseplate disposed adjacent said housing and coupled to said second piston rod,
    an expandable collect disposed in said baseplate and having a mandrel disposed therein, said mandrel operably coupled to said first piston rod, and
    pneumatic control means for providing compressed air to said first and said second cylinders for sequentially expanding said collet and advancing said spindles and retracting said spindles and collapsing said collet.

12. The dual bit drilling machine of claim 11 wherein said housing includes a second, smaller housing pivotally secured to said housing, said second, smaller housing defining one of said pair of spindle receiving apertures.

13. The dual bit drilling machine of claim 12 further including longitudinal axial adjustment means for coupling said housing and said second, smaller housing, said axial adjustment means including a threaded member having a region of threads defining a first lead and a second region of threads defining a second, distinct lead, said first region of threads received in said housing in a complementarily threaded aperture and said second region of threads being received in said second, smaller housing in a complementarily threaded aperture.

14. The dual bit drilling machine of claim 12 wherein said second, smaller housing is pivotally secured to said housing along an axis of pivot parallel to said axes of said spindles and means for maintaining a position of said second, smaller housing relative to said housing.

15. The dual bit drilling machine of claim 11 wherein said means for driving said spindles is a pneumatic motor and wherein said pneumatic control means includes a manually operated valve for providing compressed air to said pneumatic motor and a control valve having a first state which provides compressed air to one face of said first piston for advancing said spindles and to said second piston for expanding said collet and a second state for providing compressed air to said first piston for retracting said spindle and to said second piston for collapsing said collet.

16. The dual bit drilling machine of claim 11 further including dashpot means for counteracting the force generated by said first piston when said first piston is advancing said spindles.

17. The dual bit drilling machine of claim 11 wherein one of said piston rods defines a through, coaxial passageway and the other of said piston rods is disposed within said passageway.

18. The dual bit drilling assembly of claim 11 further including a drill bit disposed in each of said pair of spindles.

19. A dual bit drilling assembly comprising, in combination,
a pair of spaced-apart drill bit receiving spindles,
a first housing defining a first aperture for rotatably receiving one of said pair of spindles,
a second housing adjustably secured to said first housing and defining a second aperture for rotatably receiving the other of said pair of spindles,
a first cylinder defined by said housing, a first piston slidably disposed in said first cylinder and coupled to a first piston rod,
a second cylinder defined by said housing, a second piston slidably disposed in said second cylinder and coupled to a second piston rod,
a baseplate disposed adjacent said housing and coupled to said second piston rod,
an expandable collet extending through said baseplate and having a mandrel disposed therein, said mandrel operably coupled to said first piston rod, and
control means for providing compressed air to said first and said second cylinders for sequentially expanding said collet and advancing said spindles and retracting said spindles and collapsing said collet.

20. The dual bit drilling assembly of claim 19 further including second means for adjusting the longitudinal axial position of one of said spindles relative to the other of said spindles.

21. The dual bit drilling assembly of claim 19 further including dashpot means operably disposed between said housing and said baseplate for opposing force generated by said second piston.

22. The dual bit drilling assembly of claim 19 wherein said dashpot means includes a dashpot piston rod and further including a threaded adjustment member disposed in said baseplate and aligned with said dashpot piston rod.

23. The dual bit drilling assembly of claim 19 wherein said control means includes a shuttle valve having a first state which provides compressed air to said first cylinder for expanding said collet and to said second cylinder for translating said baseplate toward said housing and a second state which provides compressed air to said second cylinder for translating said baseplate away from said housing and to said first cylinder for collapsing said collet and a pulse valve means in fluid communication with said shuttle valve for disposing said shuttle valve in said first state.

24. The dual bit drilling assembly of claim 19 wherein said second housing is coupled to said first housing by a threaded pivot along an axis parallel to the axes of said spindles, said threaded pivot having a first region of threads of a first lead engaged in an aperture in said first housing having complementary threads and a second region of threads of a second lead distinct from said first lead and engaged in an aperture in said second housing having complementary threads, and means for maintaining a position of said second housing about said threaded pivot relative to said first housing.

25. The dual bit drilling assembly of claim 19 wherein said first and said second cylinders are arranged coaxially and separated by a bulkhead.

26. A control assembly for a drilling apparatus, comprising, in combination,
valve means for initiating an operating cycle,
a two state shuttle valve defining a first and a second end and having a first, advance state and a second, retract state,
a pulse valve having an input in fluid communication with said valve means and an output in fluid communication with one end of said shuttle valve for disposing said shuttle valve in said first state when said valve means is activated,
a housing defining a first cylinder in fluid communication with said shuttle valve and a second cylinder in fluid communication with said shuttle valve, said first cylinder having a first piston slidably disposed therein and said second cylinder having a second piston slidably disposed therein,
a baseplate disposed adjacent said housing and operably coupled to said first piston, a collet assembly including a mandrel operably coupled to said second piston and extending through said baseplate,
a vent in fluid communication with said second end of said shuttle valve,
stop means coupled to said baseplate for closing said vent and disposing said shuttle valve in said second, retract state,
whereby said second piston translates to expand said collet and said first piston translates said baseplate toward said housing when said shuttle valve is in said first state and said first piston translates said baseplate away from said housing and said second piston translates to collapse said collet when said shuttle valve is in said second state.

27. The dual bit drilling assembly of claim 26 further including dashpot means operably disposed between said housing and said baseplate.

28. A dual bit drilling machine comprising, in combination,
a pair of spaced-apart spindles adapted to receive a respective pair of drill bits,
means for driving said pair of spaced-apart spindles,
a first housing including means for rotatably receiving one of said spindles along a first axis,
a second housing including means for rotatably receiving the other of said spindles along a second axis parallel to said first axis,
means for pivotally coupling said second housing to said first housing along a third axis parallel to and spaced from said first axis, and
means for maintaining a selected position of said second housing relative to said first housing.

29. The dual bit drilling machine of claim 28 wherein said driving means includes a motor operably coupled to an output pinion gear and each of said spindles includes a pinion gear driven by said output gear.

30. The dual bit drilling machine of claim 28 further including means for adjusting the longitudinal axial position of said second spindle relative to said first spindle.

31. The dual bit drilling machine of claim 30 wherein said longitudinal adjusting means includes a threaded pivot disposed along said third axis, said threaded pivot having a first region of threads of a first lead engaged by complementary threads in an aperture in said first housing and a second region of threads of a second lead distinct from said first lead engaged by complementary threads in an aperture in said second housing.

32. The dual bit drilling machine of claim 28 further including a workpiece engaging member having a pair of spaced-apart apertures adapted to receive said respective pair of drill bits and means adapted for insertion in an aperture in said workpiece.

33. The dual bit drilling machine of claim 32 wherein said means adapted for insertion is a fixed pin.

34. The dual bit drilling machine of claim 32 wherein said means adapted for insertion is an expandable collet.

* * * * *